(12) United States Patent
Sezan et al.

(10) Patent No.: US 7,382,927 B2
(45) Date of Patent: Jun. 3, 2008

(54) SYSTEM FOR CONSTRUCTING MOSAIC IMAGES

(75) Inventors: M. Ibrahim Sezan, Camas, WA (US); Regis J. Crinon, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 10/116,977

(22) Filed: Apr. 4, 2002

(65) Prior Publication Data

US 2002/0135672 A1 Sep. 26, 2002

(51) Int. Cl.
*G06K 9/36* (2006.01)
(52) U.S. Cl. ...................... 382/243; 382/284
(58) Field of Classification Search ........... 382/243, 382/232, 233, 236, 286; 348/699; 375/240.08, 375/240.01, 240.12
See application file for complete search history.

(56) References Cited

U.S. PATENT DOCUMENTS

| | | | |
|---|---|---|---|
| 5,187,754 A | 2/1993 | Currin et al. | 385/54 |
| 5,195,174 A | 3/1993 | Kagawa | 395/102 |
| 5,488,674 A | 1/1996 | Burt et al. | 382/284 |
| 5,625,462 A | 4/1997 | Ohta et al. | 386/46 |
| 5,634,091 A | 5/1997 | Sands et al. | 395/117 |
| 5,649,032 A | 7/1997 | Burt et al. | 382/284 |
| 5,657,073 A | 8/1997 | Henley | 348/38 |
| 5,689,611 A | 11/1997 | Ohta et al. | 386/46 |
| 5,943,445 A * | 8/1999 | Dufaux | 382/236 |
| 6,785,331 B1 * | 8/2004 | Jozawa et al. | 375/240.12 |

FOREIGN PATENT DOCUMENTS

WO WO 98/36577 * 8/1998

OTHER PUBLICATIONS

Sawhney et al., "Dominant and Multiple Motion Estimation for Video Representation", *IEEE*, pp. 322-325, 1995.
Anandan et al., "Video as an Image Data Source: Efficient Representaitons and Applications", *IEEE*, pp. 318-321, 1995.
Irani et al., "Video Compression using mosaic representations", *Signal Processing: Image Communication 7*, pp. 529-552, 1995.
Irani et al., "Mosaic Based Representations of Video Sequences and Their Applications", *IEEE*, pp. 605-611, 1995.

(Continued)

*Primary Examiner*—Wenpeng Chen
(74) *Attorney, Agent, or Firm*—Chernoff, Vilhauer, McClung & Stenzel

(57) ABSTRACT

A mosaic image construction system includes at least one of a decoder receiving or an encoder transmitting a sequence of pixel data frames. The sequence includes at least a first pixel data frame and a second pixel data frame. The second pixel data frame is preferably temporally later than the first pixel data frame. The second pixel data frame has an associated parameter indicating the motion of the second frame with respect to the first frame and is used in the construction of the sequence of the pixel data frames. The mosaic image is constructed using at least the first and second pixel data frames together with the associated parameter.

46 Claims, 8 Drawing Sheets

OTHER PUBLICATIONS

Lee et al., "A Layered Video Object Coding System Using Sprite and Affine Motion Model", *IEEE Transactions on Circuits and Systems for Video Technology*, vol. 7, No. 1, pp. 130-144, Feb. 1997.

Mann et al., "Video Orbits of the Projective Group: A Simple Approach to Featureless Estimation of Parameters", *IEEE Transactions on Image Processing*, vol. 6, No. 9, Sep. 1997.

* cited by examiner

SYSTEM FOR CONSTRUCTING MOSAIC IMAGES

This application claims priority of U.S. patent application Ser. No. 09/228,085, filed on Jan. 8, 1999.

BACKGROUND OF THE INVENTION

The present invention relates to a system for constructing mosaic images from a sequence of frames encoded using global motion parameters.

When a video camera is moved angularly while recording a sequence of frames each frame shows a slightly different angular "slice" of a complete scene. By aligning the images on each frame with the images on its neighboring frames, a panoramic mosaic image may be compiled showing a greater angular view than any individual frame alone. This technique has also been widely used with still image photography to compose a photographic mosaic image where the camera angle was not wide enough to capture the entire scene with one photograph.

In an MPEG-2 system frames of data are transmitted as a plurality of 16×16 pixel data macro blocks. Some macro blocks have an associated motion vector. If the contents of a particular macroblock can be matched with a corresponding 16×16 pixel array in the previous or next video frame, then the contents of the macroblock is transmitted efficiently as a difference signal and one or more displacement vectors. The purpose of the displacement vector is to identify the location of the macroblocks in the previous or next video frame. If more than one vector is used, then each displacement vector specifies the displacement of each of the 8×8 blocks in the macroblocks. The purpose of the difference signal is to convey the sample value residuals between pixel values in the macroblocks and pixel values in the corresponding 16×16 image pixel blocks. Residual signals are typically small because displacement vectors align video frame content in time, thereby reducing the amount of data that must be transmitted to represent every frame.

Burt et al., U.S. Pat. No. 5,488,674, disclose a system for fusing images into a mosaic image based on hierarchical spatial decomposition of each image. The decomposition is used to identify salient features in each image. The composing mechanism uses the most salient features to build the mosaic. The technique described by Burt et al. does not include the situation where image fusion is performed in digital video encoding/decoding environment and over a digital communication channel. In particular, the image matching technique does not make use of the motion vectors or global motion parameters which are transmitted by an MPEG-2 or MPEG-4 encoder, respectively.

Burt et al., U.S. Pat. No. 5,649,032, describe a system for building a mosaic within a video encoding and decoding system from a series of images which are automatically warped. The image merging operations for the mosaic are pixel-based and are performed at various scales (from low resolution to original resolution). Burt et al. also disclose several techniques for aligning, selecting, and combining images. The mosaic is used to provide a prediction signal such that only the difference between the current image content and the most recent mosaic is transmitted. A residual analysis is performed at the end of each merging process to identify candidate signals to transmit. The reconstructed mosaics are an integrated part of the encoding and decoding process. Hence, the mosaic reconstruction process impacts the computational and memory requirements of both the encoder and decoder.

In MPEG-4, frames of pixel data are divided into data objects. The different data objects may be encoded and transmitted separately to the decoder. The decoder receives each of the encoded data objects and reconstructs each frame of the video. In addition, one of the data objects may be the background that is relatively stationary in relation to the other objects moving in the foreground. To reduce the bandwidth required for transmission of signals between an MPEG-4 video encoder and an MPEG-4 video decoder, a global motion compensated encoding mode may be triggered in the encoder. The purpose of global motion compensation is to describe the relative global transformation of an object or a frame content in time. When an MPEG-4 encoder enables the global motion compensated mode, it estimates global motion parameters between two consecutive video frames or video fields or video objects. The global motion parameters are subsequently used to predict the content of macroblocks after they have been warped (transformed) according to the estimated global motion parameters. In addition, the set of global motion parameters is transmitted to the MPEG-4 video decoder. The benefits of using global motion compensated coding are two fold: First, it alleviates the need to transmit displacement vectors for each macroblock and second it can produce smaller residuals because global motion parameters describe the motion video content more faithfully than local displacement vectors especially for video objects that undergo motion due to relative camera motion or zoom.

What is desired, therefore, is a mosaic construction system that does not significantly increase the memory and computational requirements of a video encoding/decoding system and is not computationally intensive.

SUMMARY OF THE INVENTION

The present invention overcomes the aforementioned drawbacks of the prior art by providing a system for constructing a mosaic image that includes at least one of a decoder receiving or an encoder transmitting a sequence of pixel data frames. The second pixel data frame is preferably temporally later than the first pixel data frame. The sequence includes at least a first pixel data frame and a second pixel data frame. The second pixel data frame has an associated set of global motion parameters describing the global motion of its image content with respect to the image content in the first pixel data frame. This set of global motion parameters is used in reconstructing (through global motion compensation-based decoding) the second pixel data frame from the first pixel data frame. The mosaic image is constructed using at least the first and second pixel data frames together with the set of global motion parameters associated with the second pixel data frame.

The construction of the mosaic in a system that already includes the decoding of pixel data frames using global motion compensation alleviates the necessity of performing the computationally intensive task of analyzing the frames to determine the movement in order to align and size the frames specifically for a mosaic image. This is because the associated global motion parameters are transmitted as part of the video bitstream. Also, the composition of the mosaic at the decoder (or encoder) is independent of the encoder (or decoder) so that a mosaic builder may be included without modification of the encoder (or decoder) or impacting the memory and computational requirements of the encoder (or decoder).

DETAILED DESCRIPTION OF THE PREFERRED EMBODIMENTS

The present inventors came to the realization that the composition of a mosaic could be based on the use of global motion parameters that generally relate the overall motion between two frames of a video sequence. The use of this global motion parameter would then alleviate the necessity of performing the computationally intensive task of analyzing the frames to determine the movement in order to align and size the frames specifically for a mosaic. To overcome the necessity of estimating the set of global motion parameters between two consecutive video object frames, the present inventors came to the realization that MPEG-4 includes the transmission of global motion parameters that are used for recomposition of the video sequence. The global motion parameters also may be used by the present invention to align and size frames for a mosaic without the necessity of recalculating the relative position of the image content within the frames. In this manner the composition of the mosaic at the decoder is independent of the encoder. Therefore, a mosaic builder may be included with the decoder without modification of the encoder. In addition, the system already uses the global motion parameters for reconstruction of the video frames at the decoder so the invention does not impact required transmission bandwith at all.

Figure 1:
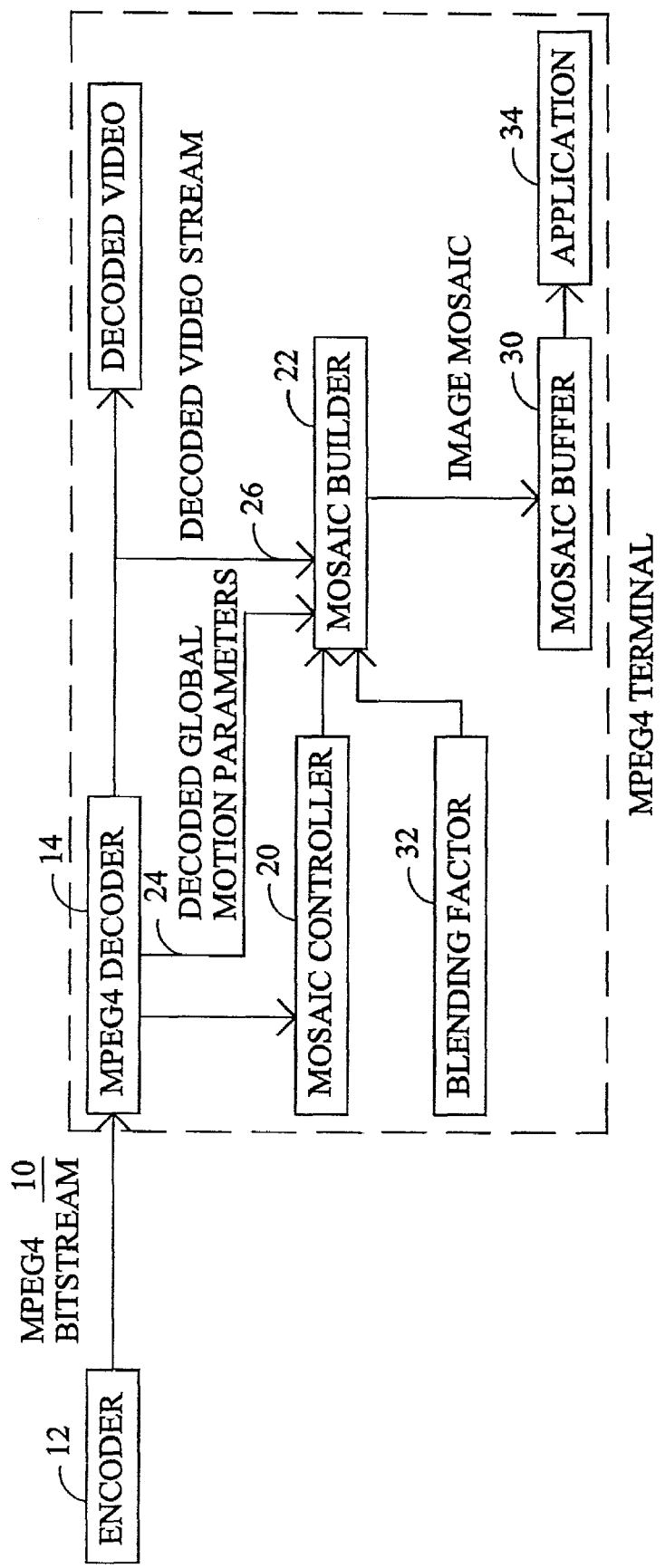
FIG. 1 is an exemplary block diagram of a mosaic construction system in accordance with the present invention.

The typical object of making a mosaic image is to create an extended image of a scene that remains generally static over time. Referring to FIG. 1, the process of creating a mosaic starts by receiving an MPEG-4 bitstream 10 from an encoder 12. The encoder 12 is preferably remotely located from a decoder 14. If desired, the encoder 12 and decoder 14 can be proximate one another, such as the same computer. The MPEG-4 bitstream 10 may be any form of signal such as, for example, electrical impulses over a cable, electromagnetic waves through the air, or data introduced into the system from a disk or other storage medium. The MPEG-4 decoder 14 receives the MPEG-4 bitstream 10. The MPEG-4 bitstream 10 includes a flag signaling the fact that global motion compensation has been used by the encoder 12. In MPEG-4 VM 8.0, the flag is a two bit field called video_object_layer_sprite_usage (VOLSU) and in MPEG-4 Version 2 Visual Working Draft Revision 5.0, the flag has been renamed sprite_enable. When VOLSU obtains a value of 0×03 the global motion compensation is used in a predictive coding for some or all of the video object planes (VOP) in the video object layer. Each video frame is the composition of several video object planes. The encoder 12 decides which macro blocks will be coded using global motion compensation and which macro blocks will be coded using local motion vectors for each VOP. For each VOPs coded with the help of global motion compensation, the values of the global motion parameters are specified by a structure called encode_sprite_trajectory.

In the MPEG-4 terminal, a mosaic controller 20 provides control to a mosaic builder 22 as to when to start and stop the construction of a mosaic. The mosaic controller 20 may be computer controlled or controlled by user inputs. If the VOLSU does not indicate the use of global motion compensation then the mosaic builder 22 ceases building a mosaic. If the VOLSU indicates the usage of global motion compensation, then the mosaic controller 20, if activated, will construct the mosaic incrementally, as each VOP is decoded by the MPEG-4 decoder 14, provided that the VOP type is such that it signals that global motion compensation was used to encode the VOP. Furthermore, the controller may elect to use additional information such as the percentage of global motion compensated macroblocks, to decide whether a VOP should be included in the mosaic reconstruction process or not.

The mosaic builder 22 receives the decoded global motion parameters 24 from the MPEG-4 decoder 14 together with the last decoded video frame or field 26. The mosaic builder 22 uses the global motion parameters associated with the most recent decoded video frame/field to warp either the decoded frame or the current mosaic. More precisely the mosaic builder 22 warps the most recently decoded video frame/field towards the mosaic by applying the global motion transformation specified by the motion parameters. In this case, the latest global motion parameters are composed with the past received global motion parameters to yield the transformation necessary to map the most recent decoded video frame onto the mosaic. Alternatively, the mosaic builder 22 may warp the mosaic image towards the most recently decoded video frame by using the inverse transformation specified by the global motion parameters associated with the video frame. The global motion parameters may be any suitable parameter(s) that describe the motion of each frame content as a whole. One type of global motion model is the affine model which is defined uniquely by 6 global motion parameters a1, a2, a3 and a4, b1, and b2. Given these parameters, the motion model governing the motion of any pixel in a frame is given by:

$$\begin{vmatrix} x_1 \\ y_1 \end{vmatrix} = \begin{vmatrix} a_1 & a_2 \\ a_3 & a_4 \end{vmatrix} \begin{vmatrix} x_0 \\ y_0 \end{vmatrix} + \begin{vmatrix} b_1 \\ b_2 \end{vmatrix}$$

where (x0,y0) define the position of a pixel in a video frame/field and $(x_1,y_1)$ define the position of the same pixel in the previous video frame/field. The vector $$\begin{vmatrix} b_1 \\ b_2 \end{vmatrix}$$

is a translation vector and the 2×2 transformation matrix $$\begin{vmatrix} a_1 & a_2 \\ a_3 & a_4 \end{vmatrix}$$

describes the motion effects such as zooming, rotation, and shearing. The resulting mosaic is stored in a mosaic buffer 30 for an application 34. The mosaic buffer 30 is initialized with the first VOP used in global motion compensation once the controller 20 has started the construction process. The mosaic controller 20 also stops the creation of the mosaic when the mosaic buffer 30 is full.

It is noted that the mosaic may be created, together with the decoding of the video, in an "on-line" manner.

A blending factor 32 that is either selected by the user or the computer system is used to merge the overlapping portions of two images, such as the mosaic and the next frame. The preferred blending factor is $0 \leq \alpha \leq 1$ where $\alpha$ is a real value determining the amount of each frame to select. The weighting factor associated with the existing mosaic is $1-\alpha$ and the weighting factor associated with the next frame or field of object pixels is $\alpha$. Thus, $1-\alpha$ percentage of the intensity of the pixels of the mosaic is merged with $\alpha$ percentage of the intensity of the next frame pixels. By selecting $\alpha$ to be 1 then the new frame replaces the overlapping portion of the mosaic. By selecting $\alpha$ to be >0 then the mosaic content is not updated. By setting $\alpha$ to be >0 and <1 then a blending occurs. The blending factor $\alpha$ is used to merge overlapping portions between the image and the mosaic. It also provides a mechanism for reducing noise and other artifacts such as those caused by any misalignment between the image content and the mosaic content.

Figure 2A:
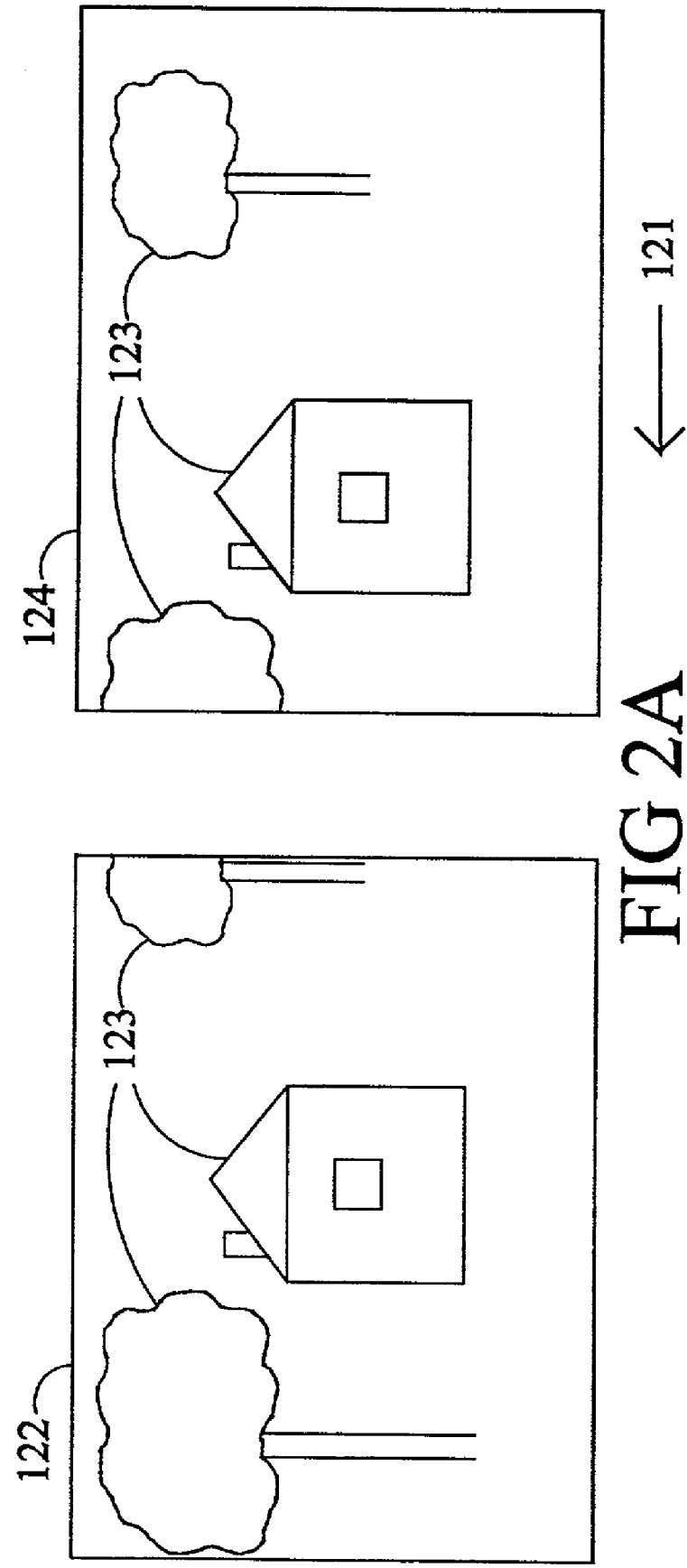
FIG. 2A shows two frames taken in sequence and spatially related by a global motion parameter.
Figure 2B:
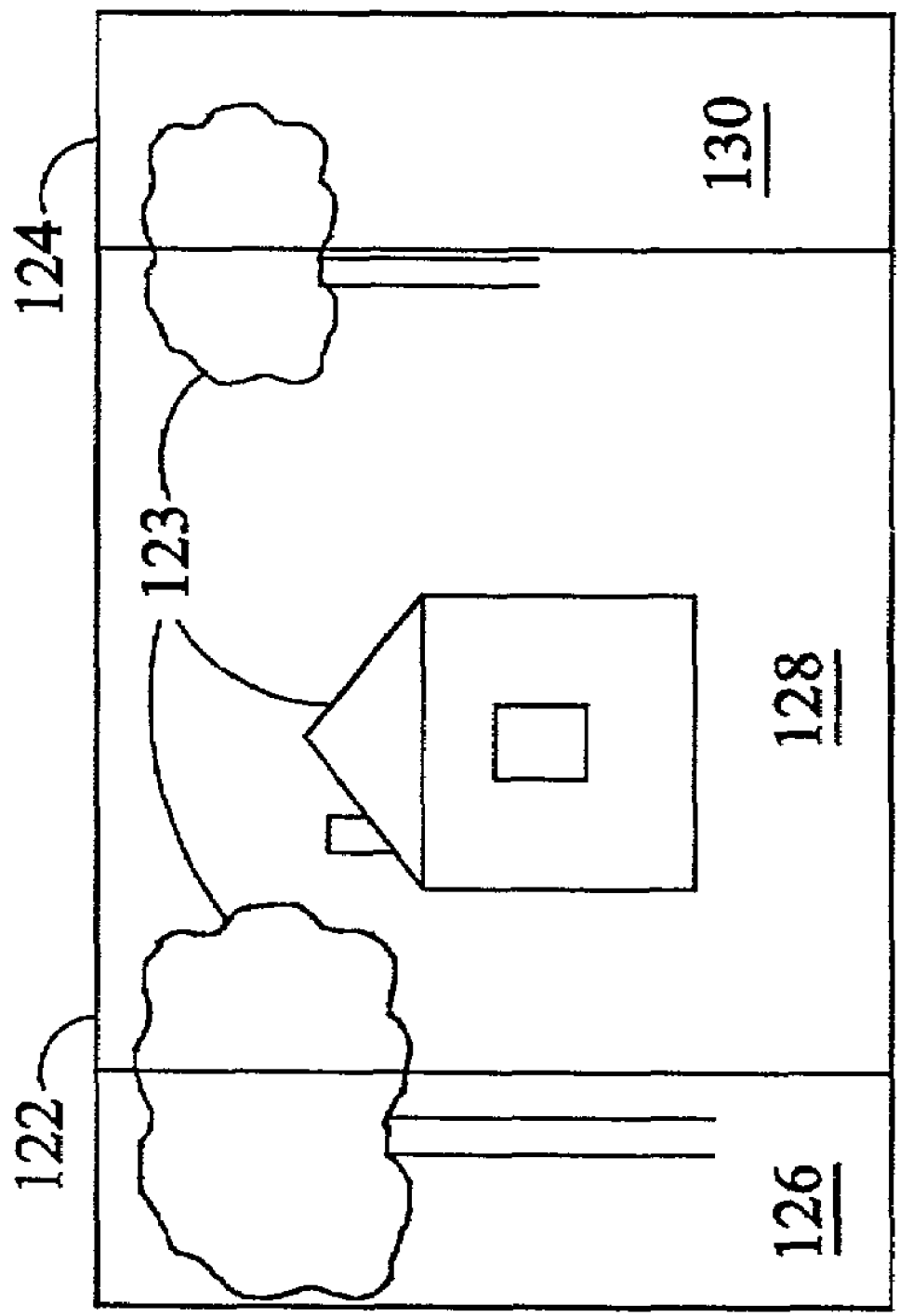
FIG. 2B shows the two frames of FIG. 2A superimposed into a single frame of reference by correcting for the global motion parameter according to the present invention.

Referring to FIG. 2A, a pair of frames 122 and 124 are related by a single translation global motion parameter 121. There are several objects 123 within each frame 122 and 124. Referring to FIG. 2B, the alignment defines an area of overlap 128 and two areas where there is no overlap 126 and 130. Any slight local movements of the foreground or background objects in the overlap region 128 between frames 122 and 124 is smeared out by the blending, as previously described.

Figure 3A:
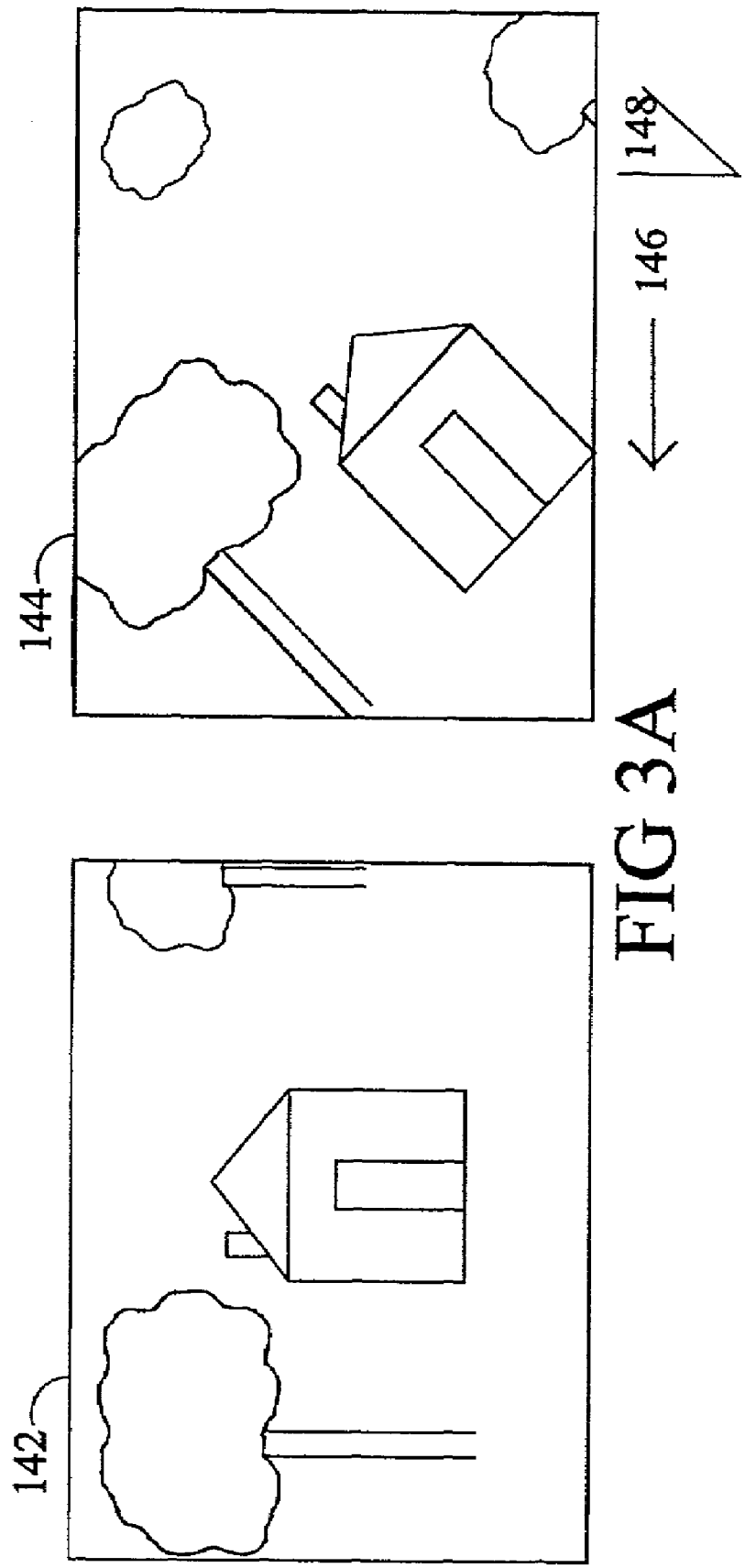
FIG. 3A shows two frames taken in sequence and spatially related by a global motion parameter.
Figure 3B:
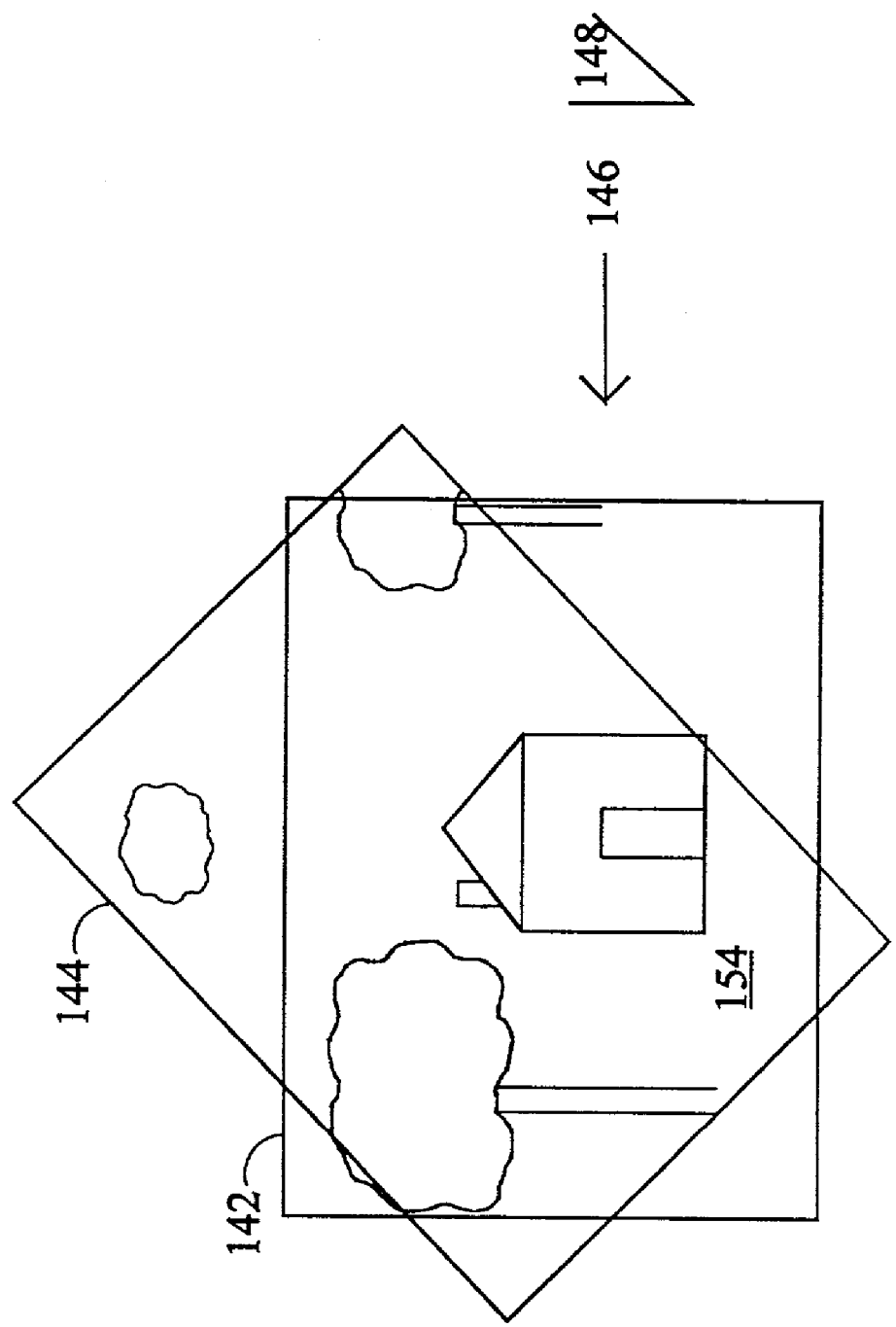
FIG. 3B shows the two frames of FIG. 3A superimposed into a single frame of reference by correcting for the global motion parameter according to the present invention.
Figure 3C:
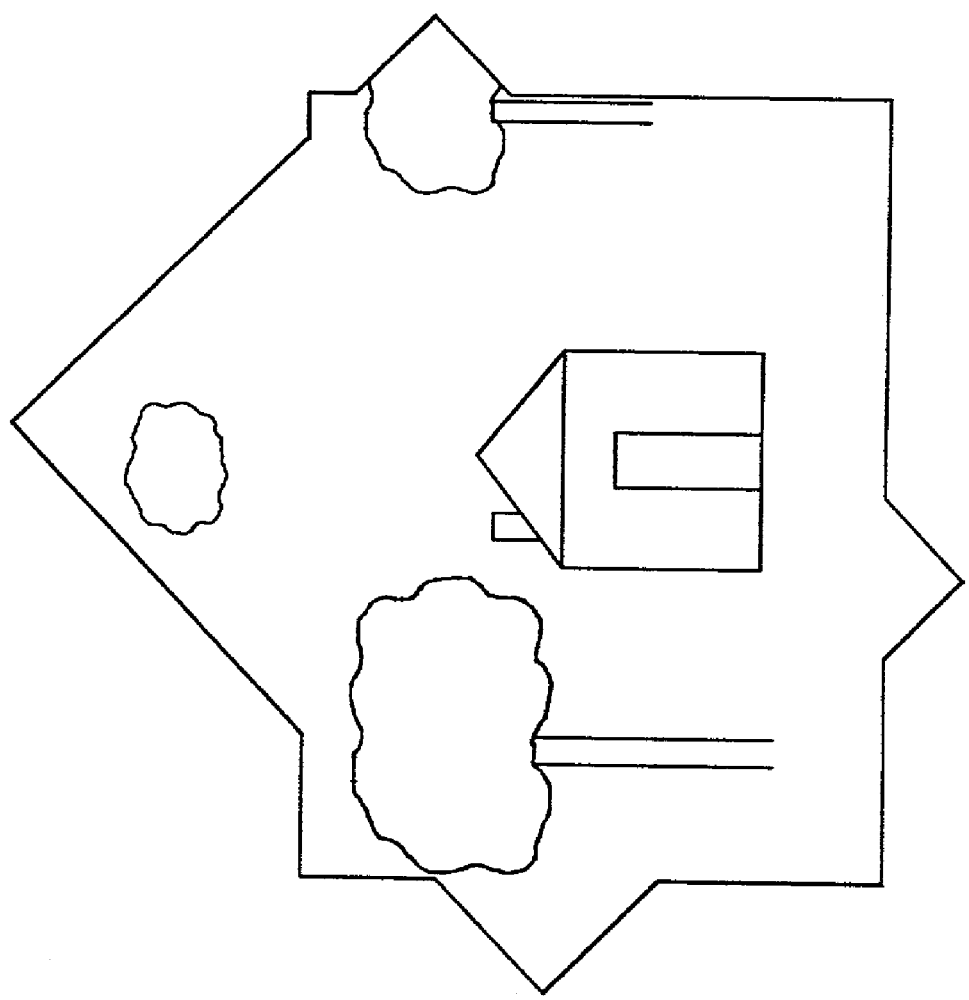
FIG. 3C shows the mosaic related from the frames and the global motion parameter of FIG. 3B.

Referring to FIG. 3A, two frames 142 and 144 are related by a translation global motion parameter 146 and a rotation global motion parameter 148. To align frames 142 and 144, a rotation and translation is performed. Referring to FIG. 3B, frames 142 and 144 are superimposed defining an area of overlap 154 and nonoverlapping areas. The completed mosaic, resulting here in this simple example from merging only two frames, is shown in FIG. 3C.

Figure 4:
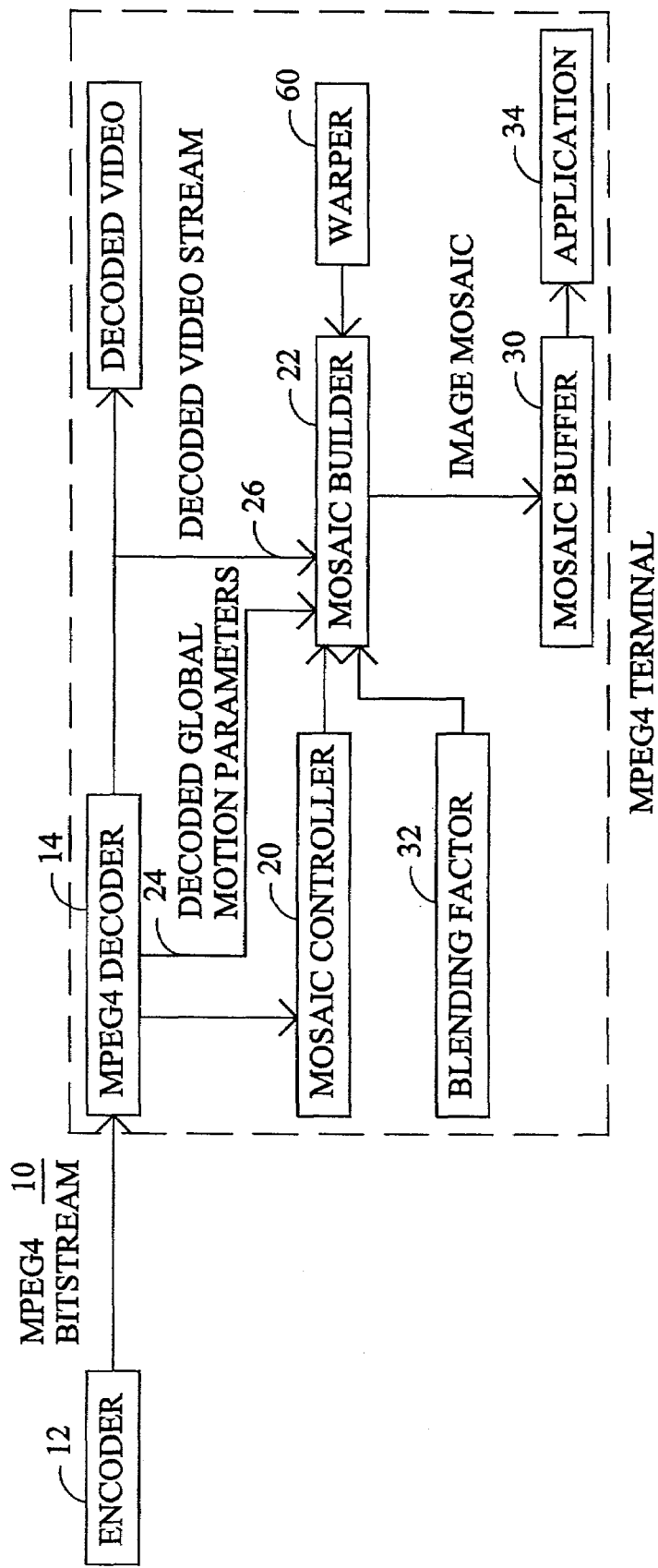
FIG. 4 is an alternative block diagram of the mosaic construction system of FIG. 1 including a warper.

Referring to FIG. 4, an additional warper 60 may be included. The warper 60 allows synthesizing a mosaic with respect to an arbitrary but fixed reference, i.e., a synthetic viewpoint. The warper 60 supplies a set of warping (global motion) parameters to warp the frames to a different reference. In other words, a synthetic zoom of the mosaic, for example, may be achieved. In this case, the warper 60 can act to increase the resolution of the resulting mosaic.

Figure 5:
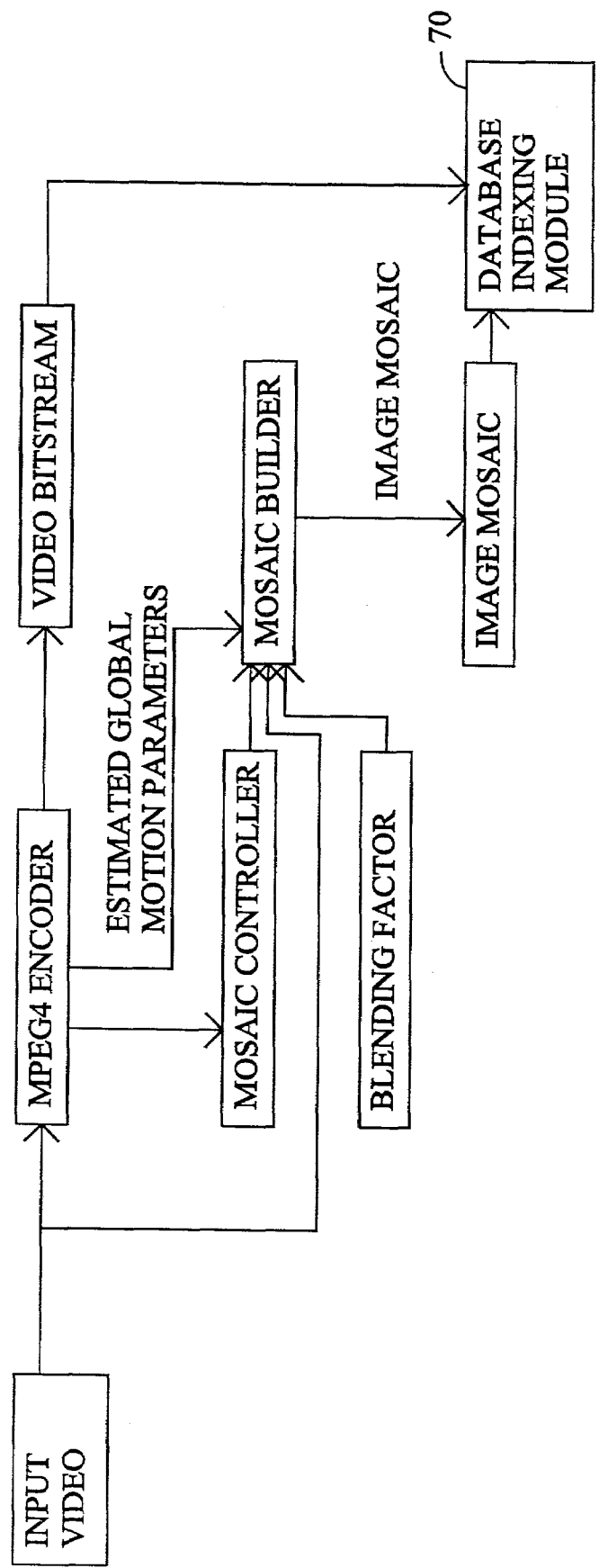
FIG. 5 is another alternative block diagram of the mosaic construction system of FIG. 1 suitable for database applications.

Referring to FIG. 5, the system may be used where the mosaic is constructed during the encoding process, in a similar manner to FIG. 1 or 4. The generated mosaic is used in indexing the video as it is stored in the database 70. The mosaic may then be used as a representative image in describing the contents of the video. The mosaic builder and mosaic controller operate on the video input as well as the global motion parameters produced by the MPEG-4 video encoder.

The present invention may be extended to the construction of multiple mosaics from successive video sequences. The video segments may be identified during the encoding or decoding process using any suitable technique.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

The invention claimed is:

1. A method of constructing a mosaic image from a sequence of source frames, said method comprising:
   (a) constructing a sequence of encoded pixel data frames at an encoder, said sequence including at least a first pixel data frame, a second pixel data frame temporally later than said first pixel data frame, said second pixel data frame having an associated parameter indicating the global motion of the entire said second pixel data frame with respect to the entire said first pixel data frame, where said associated parameter is used as a basis upon which said second pixel data frame is encoded;
   (b) transmitting from said encoder said first pixel data frame, said second pixel data frame, and said associated parameter to a decoder, said decoder not used by said encoder to encode said sequence of encoded pixel data frames;
   (c) wherein said transmitting from said encoder does not transmit an encoded, constructed said mosaic image to said decoder;
   (d) constructing at said decoder said sequence of source frames including said first pixel data frame and said second pixel data frame based upon said associated parameter;
   (e) constructing said mosaic image at said decoder using at least said first and second pixel data frames based upon said associated parameter, wherein said mosaic image has a spatial extent greater than said first pixel data frame and greater than said second pixel data frame, wherein a portion of said mosaic image consistent with a portion of said first pixel data frame and said second pixel data frame does not exist within said encoder until after said mosaic image is first constructed by said decoder based upon said first pixel data frame and said second pixel data frame, and does not exist within said decoder until after said mosaic image is first constructed by said decoder based upon said first pixel data frame and said second pixel data frame, and includes pixels representing image information in addition to that found in either individual one of said first and second pixel data frames.

2. The method of claim 1 wherein said first and second pixel data frames are encoded as an MPLG-4 bitstream.

3. The method of claim 2 wherein said MPLG-4 bitstream includes at least one of video object frames and fields encoded using global motion compensation.

4. The method of claim 3 wherein said global motion compensation is signaled by at least one bit flag.

5. The method of claim 1 wherein said first and second pixel data frames are received in said decoder.

6. The method of claim 5 wherein said first and second pixel data frames are transmitted to said decoder from said encoder.

7. The method of claim 6 wherein said encoder is remotely located from said decoder.

8. The method of claim 1 wherein said constructing said mosaic image includes a mosaic builder that merges said pixel data frames.

9. The method of claim 8 wherein said mosaic builder is activated by a mosaic controller in response to at least one of a user and a signal within the bitstream including said first and second pixel data frames.

10. The method of claim 8 wherein said constructing said mosaic image includes a blending factor to control the contribution from different images.

11. The method of claim 8 wherein said constructing said mosaic image is synthesized with respect to an arbitrary but fixed reference viewpoint.

12. The method of claim 1 wherein said mosaic image is used as a representation of said encoded sequence of pixel data frames.

13. A mosaic image construction system comprising:
(a) a decoder that receives a sequence of encoded pixel data frames, said decoder not used by an encoder to encode said sequence of encoded pixel data frames, said sequence including at least a first pixel data frame, a second pixel data frame temporally later than said first pixel data frame, said second pixel data frame encoded to include an associated parameter indicating the global motion of the entire said second pixel data frame with respect to the entire said first pixel data frame and used by said decoder to decode said second pixel data frame so as to reconstruct the entire said second pixel data frame apart from said first pixel data frame;
(b) said decoder constructing said sequence of encoded pixel data frames including said first pixel data frame, said second pixel data frame constructed based upon said associated parameter;
(c) a mosaic builder in said decoder using at least said first and second pixel data frames together with said associated parameter to construct said mosaic image, wherein said mosaic image has a spatial extent greater than said first pixel data frame and greater than said second pixel data frame, wherein a portion of said mosaic image consistent with a portion of said first pixel data frame and said second pixel data frame does not exist within said sequence of encoded pixel data frames until after said mosaic image is first constructed by said decoder based upon said first pixel data frame and said second pixel data frame.

14. The system of claim 13 wherein said first and second pixel data frames are encoded as an MPLG-4 bitstream.

15. The system of claim 14 wherein said MPLG-4 bitstream includes at least one of video object frames and fields encoded using global motion compensation.

16. The system of claim 15 wherein said global motion is signaled by at least one bit flag.

17. The system of claim 13 wherein said first and second pixel data frames are transmitted to said decoder from said encoder.

18. The system of claim 17 wherein said encoder is remotely located from said decoder.

19. The system of claim 13 wherein said mosaic builder is activated by a mosaic controller in response to at least one of a user and a signal within the bitstream including said pixel data frames.

20. The system of claim 19 wherein said mosaic image is constructed in accordance with a blending factor to control contribution from different images.

21. The system of claim 13 wherein said mosaic image is synthesized with respect to an arbitrary but fixed reference viewpoint.

22. The method of claim 13 wherein said mosaic image is used as a representation of said encoded sequence of pixel data frames.

23. A mosaic image construction system comprising:
(a) an encoder that receives and encodes a sequence of pixel data frames each frame having a respective spatial extent when received by said encoder, said encoder transmitting an encoded said sequence of pixel data frames to a decoder not used by said encoder to encode said sequence of pixel data frames, each encoded said pixel data frame having said respective spatial extent, said encoded sequence including at least a first pixel data frame, a second pixel data frame temporally later than said first pixel data frame, said encoded second pixel data frame including an associated parameter indicating the global motion of the entire said second pixel data frame with respect to the entire said first pixel data frame where said associated parameter is used as a basis upon which said second pixel data frame is decoded; and
(b) a mosaic builder using at least said first and second pixel data frames together with said associated parameter to construct a mosaic image, wherein said mosaic image has a spatial extent greater than said first pixel data frame and greater than said second pixel data frame, wherein a decoder constructs said encoded pixel data frames including said first pixel data frame, said second pixel data frame based upon said associated parameter.

24. The system of claim 23 wherein said first and second pixel data frames are encoded as an MPLG-4 bitstream.

25. The system of claim 24 wherein said MPLG-4 bitstream includes at least one of video object frames and fields encoded using global motion compensation.

26. The system of claim 25 wherein said global motion compensation is signaled by at least one bit flag.

27. The system of claim 23 wherein said first and second pixel data frames are transmitted to said decoder from said encoder.

28. The system of claim 27 wherein said encoder is remotely located from said decoder.

29. The system of claim 23 wherein said mosaic builder is activated by a mosaic controller in response to at least one of a user and a signal within the bitstream including said pixel data frames.

30. The system of claim 29 wherein said mosaic image is constructed in accordance with a blending factor to control contribution from different images.

31. The system of claim 23 wherein said mosaic image is synthesized with respect to an arbitrary but fixed reference viewpoint.

32. The method of claim 23 wherein said mosaic image is used as a representation of said encoded sequence of pixel data frames.

33. A method of constructing a mosaic image comprising:
(a) constructing a sequence of encoded pixel data frames at an encoder, said sequence including at least a first pixel data frame, and a second pixel data frame, said second pixel data frame having an associated parameter indicating the global motion of the entire said second pixel data frame with respect to the entire said first pixel data frame, where said associated parameter is used as a basis upon which pixel values of said second pixel data frame are selectively not encoded; and
(b) constructing said mosaic image at a decoder using at least said first and second pixel data frames together with said associated parameter, wherein said mosaic image has a spatial extent greater than said first pixel data frame and greater than said second pixel data frame, wherein a decoder constructs said pixel data frames including said first and second pixel data frame, said second pixel data frame constructed using said associated parameter together with pixel values of said first frame.

34. The method of claim 33 wherein said first and second pixel data frames are encoded as an MPLG-4 bitstream.

35. The method of claim 34 wherein said MPLG-4 bitstream includes at least one of video object frames and fields encoded using global motion compensation.

36. The method of claim 35 wherein said global motion is signaled by at least one bit flag.

37. The method of claim 33 wherein said first and second pixel data frames are received in said decoder.

38. The method of claim 37 wherein said first and second pixel data frames are transmitted to said decoder from said encoder.

39. The method of claim 38 wherein said encoder is remotely located from said decoder.

40. The method of claim 33 wherein said constructing said mosaic image includes a mosaic builder that merges said pixel data frames.

41. The method of claim 40 wherein said mosaic builder is activated by a mosaic controller in response to at least one of a user and a signal within the bitstream including said first and second pixel data frames.

42. The method of claim 40 wherein said constructing said mosaic image includes a blending factor to control contribution from different images.

43. The method of claim 40 wherein said constructing said mosaic image is synthesized with respect to an arbitrary but fixed reference viewpoint.

44. The method of claim 33 wherein said mosaic image is used as a representation of said sequence of pixel data frames.

45. The method of claim 8 wherein said first frame is selected as the initial mosaic image.

46. The method of claim 40 wherein said first frame is selected as the initial mosaic image.

* * * * *

UNITED STATES PATENT AND TRADEMARK OFFICE
CERTIFICATE OF CORRECTION

PATENT NO. : 7,382,927 B2  Page 1 of 1
APPLICATION NO. : 10/116977
DATED : June 3, 2008
INVENTOR(S) : M. Ibrahim Sezan et al.

It is certified that error appears in the above-identified patent and that said Letters Patent is hereby corrected as shown below:

Col. 6, line 47
Change "MPLG-4" to --MPEG-4--.

Col. 6, line 48
Change "MPLG-4" to --MPEG-4--.

Col. 7, line 41
Change "MPLG-4" to --MPEG-4--.

Col.7, line 42
Change "MPLG-4" to --MPEG-4--.

Col. 8, line 26
Change "MPLG-4" to --MPEG-4--.

Col. 8, line 27
Change "MPLG-4" to --MPEG-4--.

Col. 9, line 5
Change "MPLG-4" to --MPEG-4--.

Col. 9, line 6
Change "MPLG-4" to --MPEG-4--.

Signed and Sealed this

Twelfth Day of August, 2008

JON W. DUDAS
*Director of the United States Patent and Trademark Office*